(No Model.)
J. SULLY.
GALVANIC BATTERY.
No. 585,855. Patented July 6, 1897.
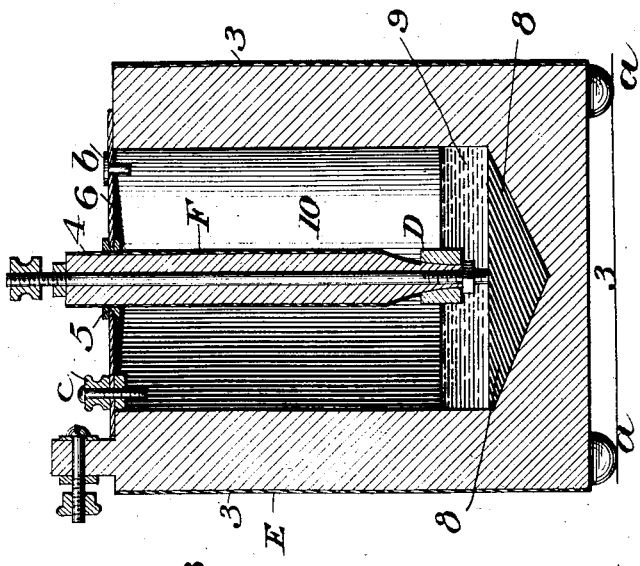
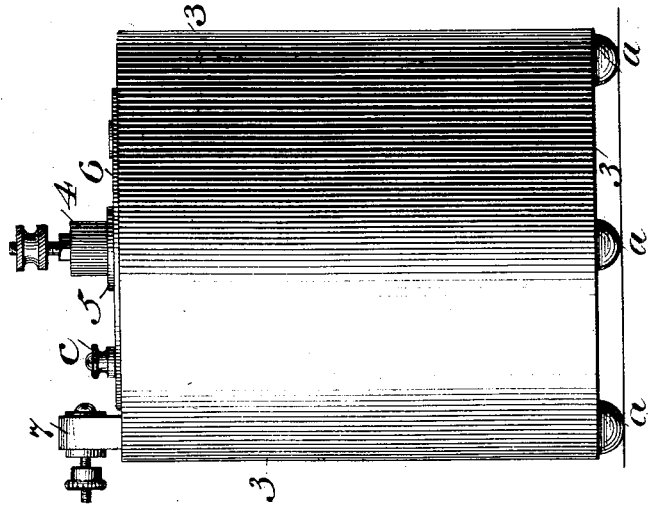
Witnesses.
Inventor.
James Sully

UNITED STATES PATENT OFFICE.

JAMES SULLY, OF NEW YORK, N. Y.

GALVANIC BATTERY.

SPECIFICATION forming part of Letters Patent No. 585,855, dated July 6, 1897.

Application filed February 16, 1897. Serial No. 623,749. (No model.)

*To all whom it may concern:*

Be it known that I, JAMES SULLY, a citizen of the United States, and a resident of New York, in the county of New York and State of New York, have invented certain new and useful Improvements in Galvanic Batteries, of which the following is a specification.

The object of my invention is to produce a single-fluid galvanic-battery cell that will maintain a nearly-constant electromotive force on closed circuit for several weeks at a time and in a more simple and economical form than closed-circuit batteries generally now in use. I attain this object by mechanism illustrated in the accompanying drawings, in which—

Figure 1 is a side elevation of one complete cell, showing the containing vessel, which is also the negative electrode, exposed externally to the air. $a\ a\ a$ are three rubber knobs fastened to the bottom of the vessel to insulate it from anything it may rest upon.

Fig. 2 is a vertical section of the cell. 3 3 3 are the walls of the vessel, one inch thick; 4, carbon pencil passing through the rubber ring; D, an ingot of aluminium fastened to the lower end of the carbon pencil; 5, rubber ring; 6, copper cover of vessel supporting rubber ring; 7, binding-post of negative vessel; 8, paraffin insulation of the inner bottom of vessel; 9, mercury contained in the paraffin insulation in which the aluminium on the carbon pencil rests; 10, the electrolyte within the vessel; $b\ b\ b$, three copper plugs riveted through the copper cover to hold the cover in place; $c$, a thumb-screw projecting above the cover as a lifter and under the cover as a fourth plug; E, beeswax coating on the surface of the vessel; F, beeswax coating on the surface of the carbon pencil.

To carry my invention into effect, I use as the negative electrode a porous gas-coke-carbon cylindrical cup five and one-half inches high by five inches diameter, left externally exposed to the air. The inside of the cup is four and one-half inches deep by three inches diameter, leaving the walls of the cup one inch thick. The inner bottom and about one inch in depth on the sides of the inner bottom of the cup is covered with a thin layer of paraffin, forming an insulating-receptacle for a small quantity of quicksilver, which serves to amalgamate the aluminium. The top of the cup has a small elevation, through which a binding-screw is placed to attach to the conducting-wire. The external bottom of the cup is provided with three small rubber knobs to insulate the cup from anything it may rest upon. The top of the cup is covered with a sheet of copper provided with three plugs of copper to hold it in place and a fourth plug projecting on top as a lifter. Through the center of the cover there is an opening to admit a rubber ring. Through this ring the positive electrode, a carbon-aluminium pencil, rests insulated from the copper cover.

In order to leave the carbon vessel porous, so that the fluid may permeate the carbon walls without passing through onto the surface, I polish its external surface by first heating the cup, and then while hot rub over the surface a small quantity of beeswax. This sufficiently closes the pores to prevent the liquid from coming onto the surface and renders the surface pleasing to sight and clean to handle.

For the electrolyte I use a mixture of carbonate of potash and kerosene-oil.

Heretofore in my application for Letters Patent for improvement in galvanic batteries, Serial No. 610,202, filed October 27, 1896, I have described and claimed all of the above-described cell except the positive electrode.

My object in desiring a cell with a carbon-aluminium or carbon-zinc electrode is as follows: I have found that with a zinc pencil there is always a portion of the pencil that is necessarily wasted, as well as the binding-screw of the zinc, whereas a small piece of zinc may be attached to the immersed end of the carbon pencil and entirely consumed without detriment to the force of the cell, and the carbon pencil may be used indefinitely. In the case of a number of cells together the dissolved zinc forms zincate of potassium in a few days and eventually deteriorates the battery, but with one or two cells used as a local battery and with considerable external resistance, about twenty ohms, it is quite constant for many days. In this manner it is very desirable, being neat, clean, and inexpensive. With aluminium, sodium aluminate forms and does not deteriorate the battery like the dissolved zinc.

The carbonate-of-potash solution acts more energetically on aluminium than on zinc. Consequently the output is somewhat greater than with the zinc. It is not apparently so clean as the zinc element; but I find that, although the electrolyte has a muddy appearance from the constant commotion of the fluid, when the aluminium is a small piece, an ounce or less, connected to the carbon pencil and immersed several inches below the surface of the fluid the precipitated matter barely reaches the surface and is there dissolved. Very little insoluble matter forms in the cell, and it requires but little attention, as it evaporates very slowly. The carbon pencil is always clean.

For the carbon pencil I use a cylindrical gas-coke-carbon pencil three-eighths of an inch in diameter (or more) and four and one-half inches long. In order to polish the surface, I treat it with beeswax in the same manner as the external surface of the cup or saturate it with beeswax. A hole is bored and a screw-thread cut in both ends of the carbon.

To one end of the carbon a thumb-screw is rigidly fixed for the connecting-wire. To the other end a screw, except the head, is passed freely through a hole in the aluminium and screwed into the pencil until the aluminium presses against the carbon.

By using a screw through the aluminium a number of small pieces may be placed on the screw, thus preventing waste.

To prepare the electrolyte.—To one pound of carbonate of potash add one gallon of water and boil. While boiling, stir in one-half gill of kerosene-oil. Boil five minutes. When cool, strain through a cotton cloth. Place in glass vessels.

To prepare and care for the battery.—Place a small quantity of mercury (not exceeding five or six grams) in the cup. Fill the cup to within an inch of the top with the solution and place the carbon-aluminium or carbon-zinc pencil through the rubber ring. Let it rest in the mercury. Supply the loss by evaporation of the solution, and when necessary add a piece or pieces of aluminium to the carbon. It is more convenient to have an extra carbon pencil for each cell.

Having fully described my invention, what I claim, and desire to secure by Letters Patent, is—

A galvanic-battery cell, composed of a negative, porous, gas-coke, carbon, cylindrical, containing vessel, rendered sufficiently dense on its external surface to prevent the passage onto its surface of an electrolytic fluid, without destroying the porosity of the surface of the vessel or its inner porosity and insulated as described; and a positive electrode of carbon having pressed against or fastened to its lower end, a section of an easily-oxidizable metal, notably aluminium or zinc, the positive electrode being immersed in an electrolyte, composed of a solution of carbonate of potash mixed with kerosene-oil, contained within the carbon vessel and resting in a small quantity of quicksilver contained within an insulation in the bottom of the vessel, all substantially as described.

Signed at New York, in the county of New York and State of New York, this 8th day of February, A. D. 1897.

JAMES SULLY.

Witnesses:
F. B. McLEAN,
L. H. HOLLOWAY.